United States Patent [19]
Fridman

[11] Patent Number: 5,276,470
[45] Date of Patent: Jan. 4, 1994

[54] SYMBOL IMPRINTING MECHANISM FOR CAMERAS

[75] Inventor: Vladimir Fridman, New City, N.Y.

[73] Assignee: Concord Camera, Avenal, N.J.

[21] Appl. No.: 74,979

[22] Filed: Jun. 10, 1993

Related U.S. Application Data

[63] Continuation of Ser. No. 741,627, Aug. 7, 1991, abandoned.

[51] Int. Cl.⁵ .................................................. G03B 17/24
[52] U.S. Cl. .................................................. 354/106
[58] Field of Search ............................. 354/105–; 355/39, 40

[56] References Cited

U.S. PATENT DOCUMENTS

| | | | |
|---|---|---|---|
| 30,258 | 4/1880 | Fujita | 354/106 |
| 813,808 | 2/1906 | Loryea | 354/106 |
| 1,192,058 | 7/1916 | Gray | 354/106 |
| 1,224,588 | 5/1917 | Wray | 354/106 |
| 1,249,612 | 12/1917 | Gaismen | 354/106 |
| 2,051,193 | 8/1936 | Wittel | 354/106 |
| 2,226,364 | 12/1940 | Anthony | 354/106 |
| 2,490,338 | 12/1949 | Marin et al. | 354/106 |
| 3,478,657 | 11/1969 | Michels | 354/106 |
| 3,703,129 | 11/1972 | Goshima et al. | 354/106 |
| 3,733,985 | 5/1973 | Gordon | 354/106 |
| 3,739,697 | 6/1973 | Miyagawa | 354/106 |
| 3,812,508 | 5/1974 | Matsuda et al. | 354/106 |
| 3,906,523 | 9/1975 | Ogiso et al. | 354/109 |
| 3,953,868 | 4/1976 | Kawamura et al. | 354/109 |
| 4,025,931 | 5/1977 | Taguchi et al. | 354/105 |
| 4,025,932 | 5/1977 | Miyagawa | 354/106 |
| 4,028,713 | 6/1977 | Ohashi et al. | 354/106 |
| 4,062,026 | 12/1977 | Fujita | 354/106 |
| 4,085,412 | 4/1978 | Yoshino | 354/106 |
| 4,089,018 | 5/1978 | Asano | 354/106 |
| 4,114,169 | 9/1978 | Yamamori | 354/106 |
| 4,162,835 | 7/1979 | Asano | 354/106 |
| 4,165,932 | 8/1979 | Asano et al. | 354/106 |
| 4,181,416 | 1/1980 | Ohtaki et al. | 354/106 |
| 4,232,956 | 11/1980 | Hashimoto et al. | 354/106 |
| 4,268,143 | 5/1981 | Dearing et al. | 354/106 |
| 4,361,388 | 11/1982 | Mlcak et al. | 354/106 |
| 4,368,967 | 1/1983 | Imura | 354/106 |
| 4,664,491 | 5/1987 | Kazumi et al. | 354/105 |
| 4,705,372 | 11/1987 | Lapeyre | 354/106 |
| 4,751,538 | 6/1988 | Konno | 354/106 |
| 5,003,329 | 3/1991 | Itabashi | 354/106 |

*Primary Examiner*—David M. Gray
*Attorney, Agent, or Firm*—Shea & Gould

[57] ABSTRACT

A mechanism for imprinting an image on film is disclosed. The mechanism is simple, compact and inexpensive. The mechanism fits onto a camera's film door on most modern cameras, providing an interchangeable, universal system. Symbols on preprinted tapes are imprinted on film and may record the date, time, picture number or other information on photographs.

24 Claims, 7 Drawing Sheets

SYMBOL IMPRINTING MECHANISM FOR CAMERAS

This is a continuation of application Ser. No. 07/741,627, filed Aug. 7, 1991, now abandoned.

BACKGROUND OF THE INVENTION

This invention relates to a data or symbol imprinting mechanism to be used in a camera. The mechanism allows a camera user to imprint the date or time or other information on film. The mechanism is simple, compact and inexpensive.

Symbol imprinting mechanisms have long been used in cameras to record information on photographs. The camera user can use symbol imprinting mechanisms to record, on the film, information such as the date or time a photograph was taken. Mechanisms used before differ in construction but they commonly suffer from similar drawbacks and disadvantages.

The newest symbol imprinting mechanisms have been electronic. They offer flexibility in what symbol is imprinted on the film as their chief advantage. The electronic mechanism, however, suffers from being complex. This complexity requires the camera housing to be specialized and can cause the camera to be sensitive to dropping or rough handling. This complexity and requirement for a specialized housing greatly adds to the expense of these mechanisms; for many camera users the expense of the electronic mechanism is prohibitive.

Mechanical mechanisms are also used. Like the electronic mechanisms, the mechanisms that have been designed suffer from certain drawbacks and disadvantages. One of the chief drawbacks is the requirement for the camera housing to be specialized. Holes, attachments for the components, and space have all been required in the past with these mechanisms. This leads to larger, more complex and heavier cameras. Size, and an often corresponding increase in weight, is a great inconvenience to camera users. Requiring the design of a completely new camera housing, along with their complex design, often makes these old mechanical mechanisms expensive. They are also often sensitive to jarring and rough handling because of their complexity.

Mechanical mechanisms that have been used in the past also often suffer from producing a poor imprint on the film. The imprinted symbol is often inaccurately exposed on the film giving a sloppy and sometimes blurred result. This is due to a lack of precision in the mechanical mechanism itself. Some mechanical mechanisms also waste film by imprinting a symbol onto a useful portion of the film instead of the very top or bottom. Other mechanical mechanisms are inflexible as to the variety of symbols that can be imprinted and do not offer the user the opportunity to change the available symbols or sets of symbols.

Another disadvantage of mechanical mechanisms that have been used to imprint symbols on film is a lack of simplicity and ease of use for the camera user. Often it is complicated and hard to verify exactly what symbol will be imprinted on the film in these mechanisms.

For both electronic and mechanical mechanisms that have been used a common drawback or disadvantage has been the use of a complicated optical system as part of the mechanism for imprinting symbols on film. The complexity adds to the camera's size, weight, expense and sensitivity to jarring or rough handling.

An alternative to relying on an optical system is to use light from the camera lens. This often decreases the quality of the final photograph, defeating the purpose behind taking the picture.

A recent development in the manufacturing, marketing and use of cameras has created new problems with the existing mechanisms for imprinting symbols on film. The recent development is the disposable camera which is used once and then discarded. These disposable cameras must be made relatively inexpensively. To market a disposable camera with a mechanism for imprinting symbols, an inexpensive mechanism must be available.

Therefore, from the discussion above on the limitations found in the prior art, it would be desirable to have a simple, lightweight, compact and inexpensive mechanism for imprinting symbols on film that does not have the drawbacks and limitations of the mechanisms used in the past.

SUMMARY OF THE INVENTION

It is an object of this invention to provide a mechanism for imprinting symbols on film that solves many of the problems and limitations found in previously used mechanisms.

One object of this invention is to provide a simple, lightweight, compact and inexpensive imprinting mechanism.

It is another object of this invention to provide a sturdy imprinting mechanism that is relatively insensitive to jarring and rough handling.

It is another object of this invention to provide an imprinting mechanism that does not require the camera housing to be specialized.

It is another object to provide an imprinting mechanism that is accurate and precise and that imprints on a specific area of the film.

A further object of this invention is to provide an imprinting mechanism which allows the user to easily change the symbol to be imprinted and to also change the whole set of symbols which can be imprinted.

A further object of this invention is to provide an imprinting mechanism that is easy to use and which indicates to the user what symbol is to be imprinted.

A further object of this invention is to provide an imprinting mechanism with a simple, lightweight and inexpensive optical system for projecting the desired image on the film without interfering with the exposure of the film to the image from the camera's lens.

A further object of this invention is to provide an imprinting mechanism that can be used with most types of modern cameras without affecting the inner workings of the camera.

Another object of this invention is to provide a mechanism that fits on the camera's back or on the camera's film door.

In accordance with these objects of the invention, this invention provides a mechanism for imprinting symbols on film. Photographs that are taken with cameras that have this imprinting mechanism attached can have the date or time or other symbols or information recorded on them.

The simple, lightweight design includes a housing with a tape with printed symbols, a roller, a wheel, and a simple light source. The result is an inexpensive imprinting mechanism that is simple and inexpensive to manufacture and simple to use. The user can change symbols or sets of symbols and the user can always verify what symbol will be imprinted. No specialized camera housing is required because the entire mechanism is compact and self contained in a sturdy housing that is attached to the camera's film door. By just changing a camera's film door, different sets of symbols can be added and interchanged. The mechanism can be attached to virtually any modern camera, thus providing a universal, interchangeable system.

A tape has the symbol that will be imprinted on the film. By rotating the tape by a wheel accessible to the camera user on the camera's film door, the user can change the symbol that will be imprinted. When the picture is snapped by the camera user, a bulb is triggered and a symbol like the symbol the user can see through a window on the outside of the camera's film door is imprinted on a portion of the film.

The mechanism, although simple, is accurate and precise. The light source part of the mechanism may be comprised of a bulb, mirror, and electrical circuit that are compact and do not interfere with the image from the lens.

This invention also meets a recent need created by the new development and use of disposable cameras. Because of the simplicity of the design of this invention, it can be cost-effectively used on disposable cameras which are used once and then discarded.

DESCRIPTION OF THE PREFERRED EMBODIMENTS

Figure 1:
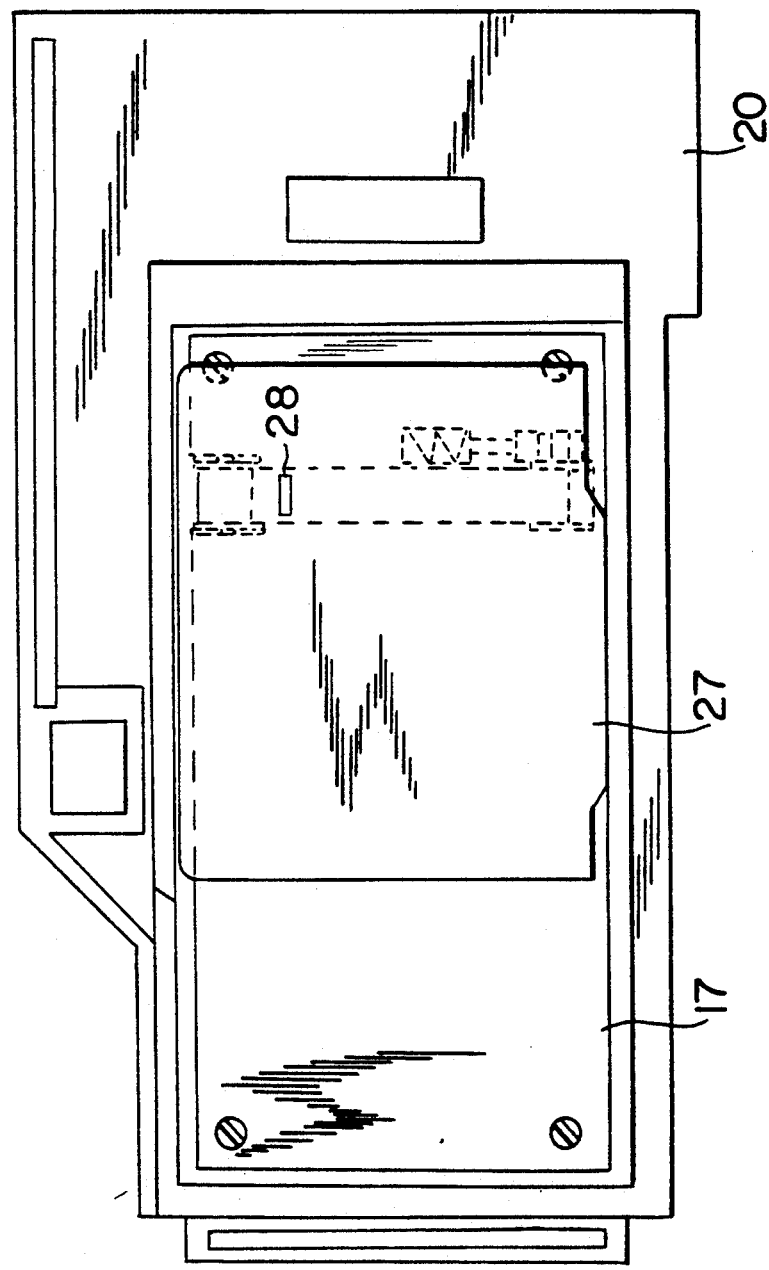
FIG. 1 is a plan view of an embodiment of the mechanism, shown attached to the inside of a camera's film door.

Referring to the drawings wherein like characters of reference indicate corresponding parts throughout, in FIG. 1 the entire mechanism with its housing is shown attached to the inside of a camera's film door 20. The entire mechanism enclosed in a housing can fit on the camera's film door and does not interfere with the other operations of the camera.

Figure 8:
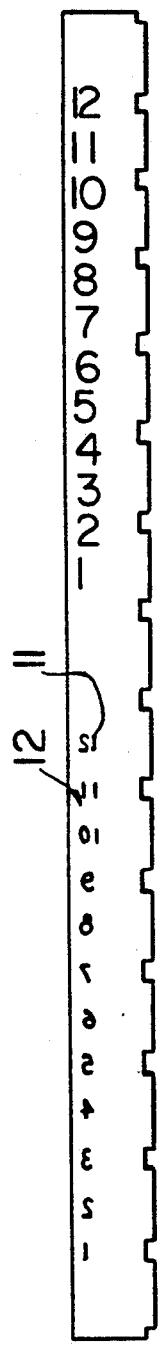
FIG. 8 is a plan view of an embodiment of a tape with printed symbols that when both ends are connected will form the endless, belt-like tape.

The symbols 11 to be imprinted are contained on a tape 12 as shown in FIG. 8. The tape is preferably fabricated from transparent polyester film. In an embodiment shown in FIG. 8, one half of the tape 12 has transparent symbols on an opaque background. The other half has opaque symbols also on an opaque background. Each of the transparent symbols of this embodiment of the tape 12 has a similar opaque symbol on another portion of the tape. As is explained further in the paragraphs that follow, the transparent symbol will be imprinted onto the film while the opaque symbol which is similar to the transparent symbol is viewable from the outside of the camera. The opaque symbol indicates to the user what transparent symbol is to be imprinted. In another preferred embodiment, the opaque symbol on the tape is larger but of the same form as the transparent symbol on the tape. By connecting the two ends of the tape 12, an endless, belt-like tape 12 is formed as shown in FIG. 4.

The symbols printed on the tape can contain any type of information, data or insignia. Preferred embodiments contain the date, time or picture number.

In the embodiment shown in FIG. 8, one edge of the tape has a uniform series of notches or perforations. The spacing of these perforations corresponds or correlates to the spacing of the printed symbols 11 on the tape 12.

Figure 2:
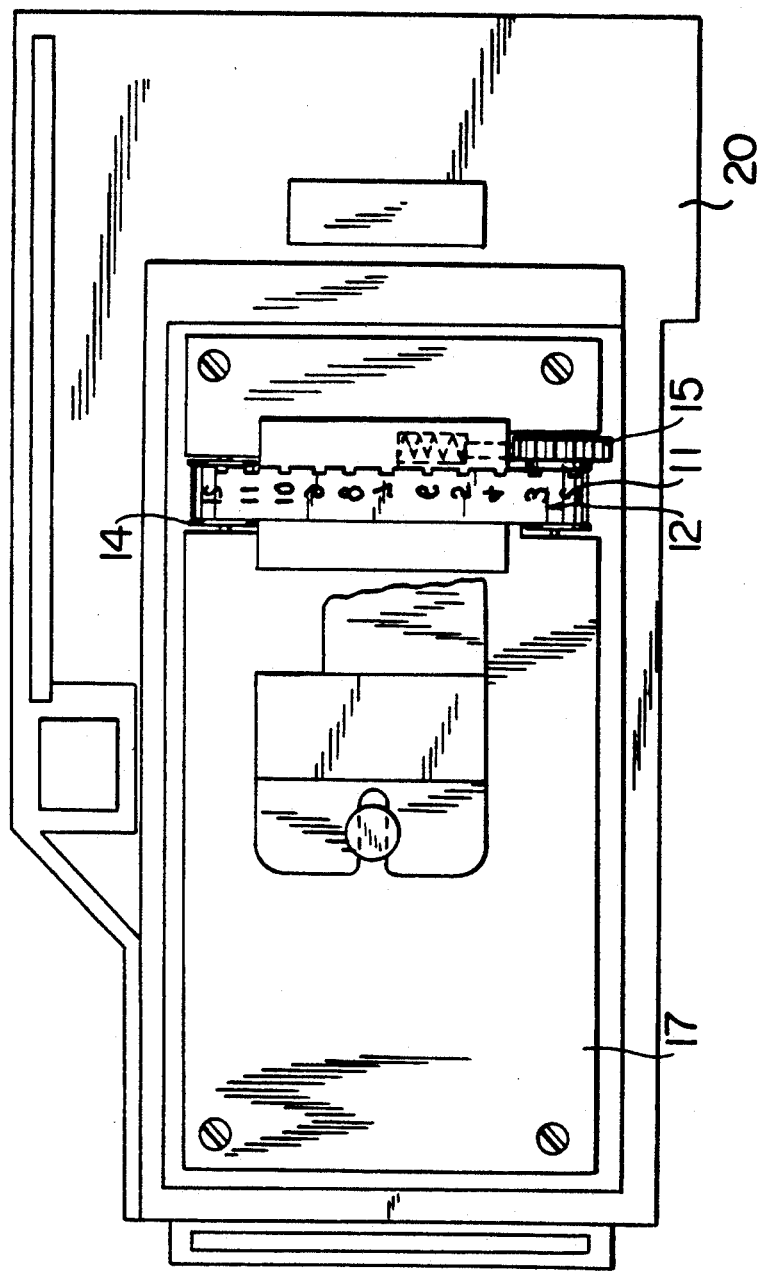
FIG. 2 is a plan view of an embodiment of the mechanism, shown attached to the inside of a camera's film door with the camera's film pressure plate removed.
Figures 4, 5:
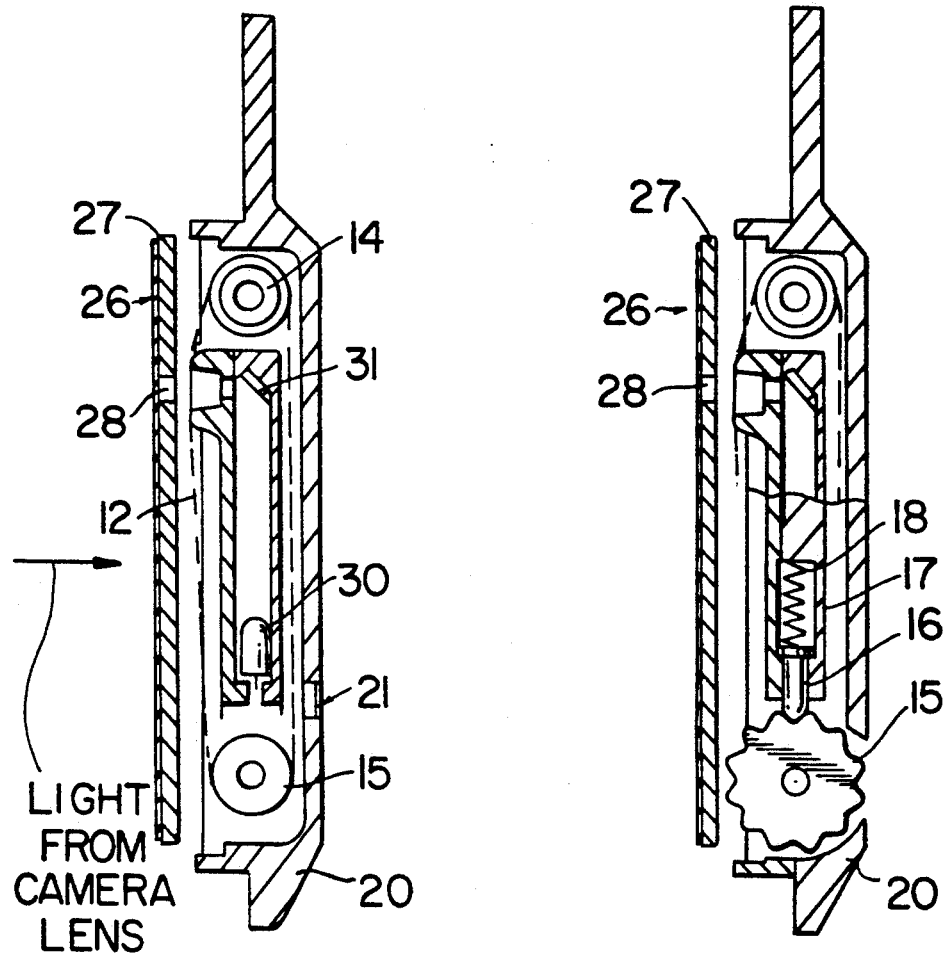
FIG. 4 is a sectional view of FIG. 3 taken along line A—A and looking in the direction of the arrows, light from the camera lens coming from the direction of the large arrow.
FIG. 5 is a sectional view of FIG. 3 taken along line B—B and looking in the direction of the arrows.

The tape 12 is mounted on a roller 14 and a wheel with a roller 15 as shown in FIG. 2 and FIG. 4.

The wheel with a roller 15 is comprised of a wheel attached to a roller. In another embodiment, not shown, the wheel is separate from the roller but the wheel can engage and turn a roller. In this embodiment with the wheel separate from the roller, the roller engaged with the wheel is the drive roller. The separate wheel and roller produce the same results as the wheel with a roller 15 embodiment.

Figure 6:
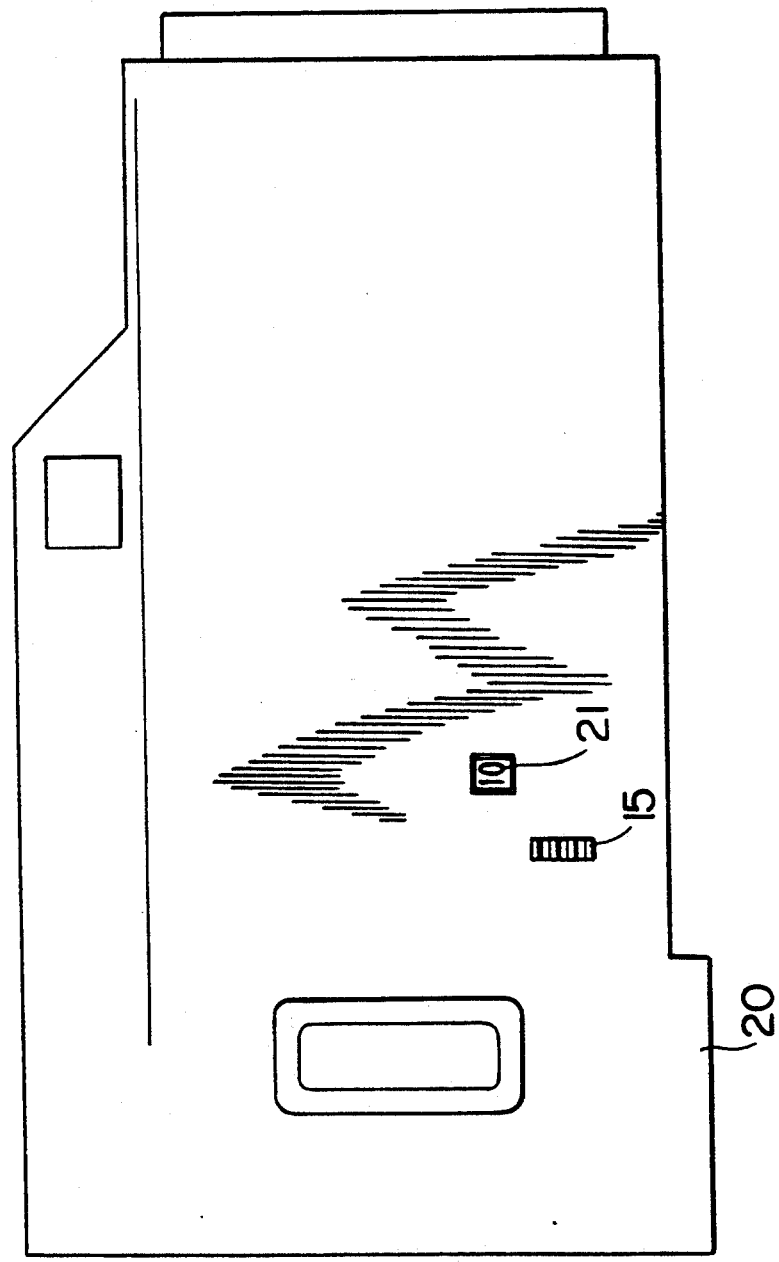
FIG. 6 is a plan view of an embodiment of the mechanism shown from the outside of the back of the camera.
Figure 7B:
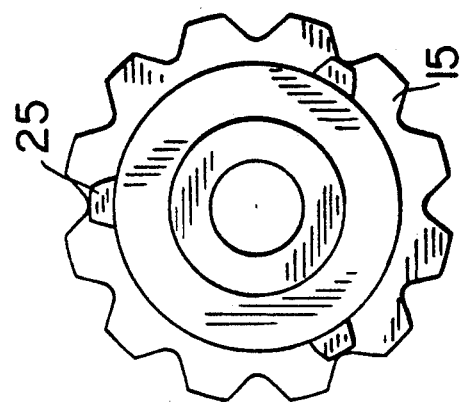
FIG. 7B is a plan view of the embodiment depicted in FIG. 7A.
Figure 7A:
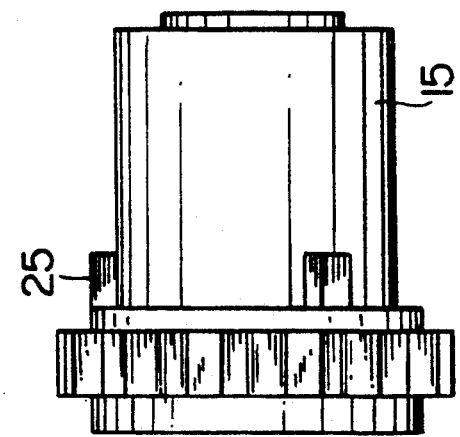
FIG. 7A is a side view of an embodiment of the wheel of the mechanism that has gear-like knurling.

The roller 14 holds the tape in place and allows the tape to be rotated. The wheel with a roller 15 acts as a drive roller to rotate the tape and also holds the tape in place. Part of the wheel with a roller 15 is accessible to the camera user on the outside of the camera's film door 20 as shown in FIG. 6. FIGS. 7A and 7B shows an embodiment of this invention where the roller portion of the wheel with a roller has teeth 25 which engage perforations on the embodiment of the tape that has perforations. In the embodiment where the wheel and drive roller are separate, the drive roller can have these same teeth.

Figure 3:
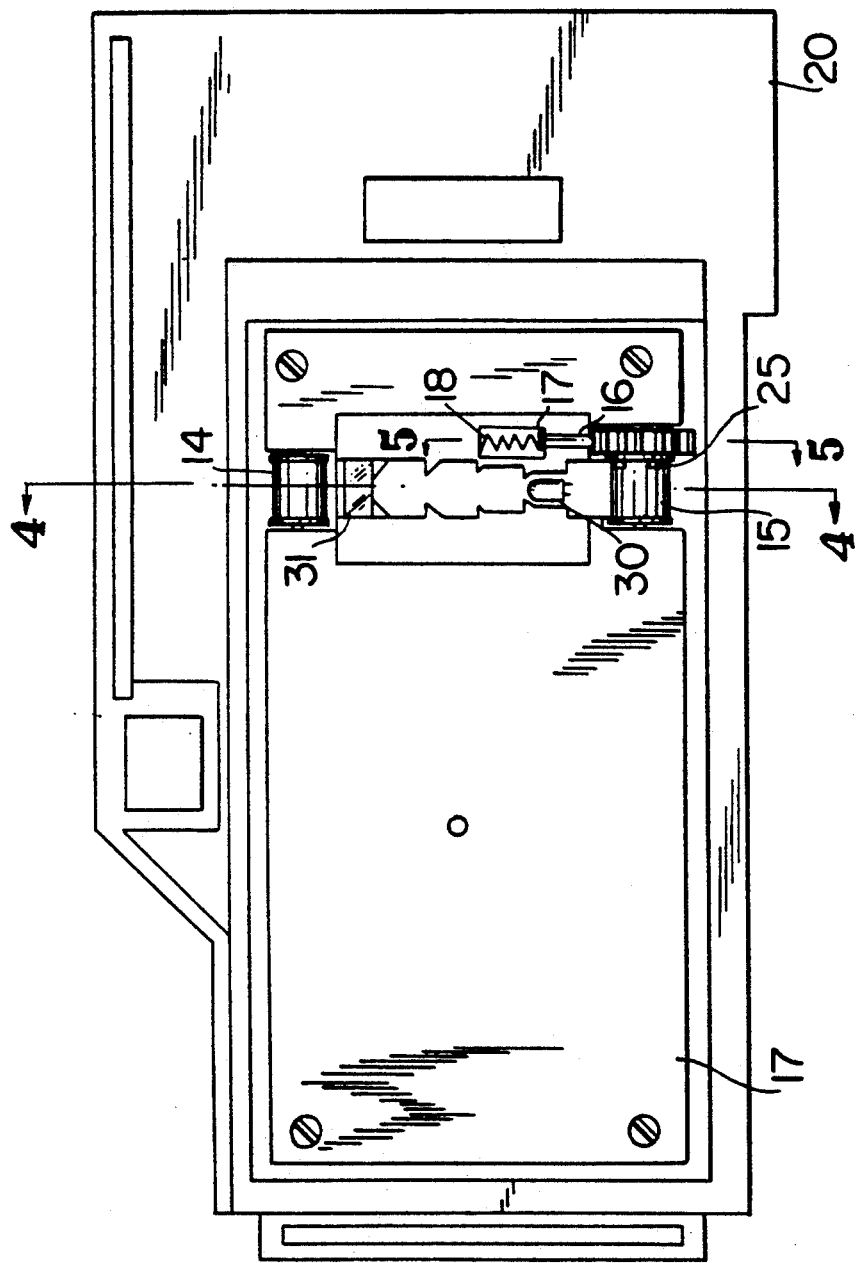
FIG. 3 is a plan view of an embodiment of the mechanism, shown attached to the inside of a camera's film door with the camera's film pressure plate and the mechanism's tape and part of the mechanism's housing removed.

Turning the wheel with a roller 15 turns and advances the tape 12. In the embodiment shown, the wheel with a roller 15 has gear-like knurling which can be turned by the camera user's fingers. The knurling on the wheel with a roller 15 also engages a fitted plunger 16 attached to a protruded portion of the mechanism's housing or frame 17. As shown in FIG. 3. and FIG. 5, the fitted plunger 16 is loaded with a spring 18 which produces a detent action with the knurling on the wheel with a roller 15, making the turning and advancement of the tape 12 occur in segments dictated by the knurling on the wheel with a roller 15 and the fitted plunger 16. The detent action produces precision and accuracy in the rotation of the tape to certain segments of the tape. Precision and accuracy is also contributed to by the embodiment of the tape that has perforations which engage the teeth 25 on the roller portion of the wheel with a roller 15 or the teeth on the drive roller in the embodiment where the wheel is separate from the roller. When the perforations of the tape, the symbols printed on the tape, and the knurling on the wheel with a roller are all correlated or coordinated, the tape can be repeatedly rotated with precision and accuracy to certain segments of the tape containing certain symbols.

In a preferred embodiment, the roller 14 and the roller portion of the wheel with a roller 15 have a rubberized surface which increases the friction between the roller and the tape 12. The rubberized surface is resilient and it produces moderate tension on the tape.

In one embodiment, when the tape 12 is mounted on the roller 14 and the roller portion of the wheel with a roller 15, a transparent symbol on an opaque portion of the tape 12 faces the film 26 through an opening 28 in the camera's film pressure plate 27. A corresponding opaque symbol on another portion of the tape 12 can be seen by the camera user from the outside of the camera through a window 21 on the camera's film door 20. The transparent symbol facing the film and the opaque symbol seen through the window are similar. The opaque symbol seen through the window indicates to the camera user what transparent symbol will be imprinted.

By rotating the wheel with a roller 15 that is accessible from the camera's film door 20 as shown in FIG. 6, the tape 12 is moved. The symbol on the tape facing the film 26 through the opening 28 in the camera's film pressure plate 27 and the symbol facing the window 21 on the camera's film door 20 can thus be changed.

The mechanism has a means for directing light from some source, through the tape, and onto the film when a picture is being taken. The film will thus be exposed to light that passes through the tape.

In a preferred embodiment shown in FIG. 4, a bulb 30 and a mirror 31 are also mounted on the imprinting mechanism housing. The bulb is connected to an electrical circuit consisting of a pair of contacts and a power source such as a battery. The contacts are closed and the bulb triggered to produce light when the camera shutter moves when a picture is being taken. The light from the bulb 30 is reflected by the mirror 31 to the opening 28 in the camera's film pressure plate 27. The tape 12 is held in place over the opening 28 in the camera's film pressure plate 27 by the roller 14 and the wheel with a roller 15 so that the light from the mirror 31 will pass though the tape 12, through the opening 28 in the camera's film pressure plate 27, and expose the film 26.

All these elements will act in concert to allow the camera user to imprint a symbol on film. First, a symbol on the tape is chosen to be imprinted by the camera user by turning the wheel with a roller 15. Turning the wheel with a roller 15 rotates the tape 12. Looking at the tape through a window 21 in the camera's film door 20 shows the camera user the section of the tape that has been rotated to and therefore what symbol is to be imprinted because the symbol on the tape seen through the window is similar to the symbol on the tape that is held over the camera's film pressure plate. It is this symbol on the tape held over the camera's film pressure plate that will be imprinted when the picture is taken.

The camera user, by opening the shutter to take a picture, will expose the film 26 to the light coming from the camera lens. The film 26 will also be exposed via this invention to light from the bulb 30 which is triggered when the shutter opens. The light from the bulb 30 exposes the film 26 by being first reflected by the mirror 31 to pass through a transparent symbol on the tape 12, and through the opening 28 in the camera's film pressure plate 27. Any symbol that was on the portion of the tape 12 over the opening 28 in the camera's film pressure plate 27 will be transmitted to the film 26.

In one embodiment, if no imprinting is desired, the user can rotate the tape 12 until an opaque portion is over the opening 28 in the camera's film pressure plate 27. An indication that this opaque portion is over the opening 28 can be the word "off" on a different portion of the tape 12 which is shown to the camera user through the window 21 on the camera's film door 20.

It is noted that while only one tape with printed symbols is shown, it should be realized that two or more tapes are contemplated as part of this invention. A preferred embodiment of this invention has at least two tapes. More rollers and wheels with rollers as well as windows on the camera's film door and openings in the camera's film pressure plate are required with more tapes. With multiple tapes the mechanism works the same way. The mechanism as shown here is simply repeated for the number of tapes that are desired.

One skilled in the art will appreciate that the present invention can be practiced by other than the described embodiments, which are presented for purposes of illustration and not of limitation, and the present invention is limited only by the claims that follow.

What is claimed is:

1. A mechanism for imprinting symbols on film, wherein the film has a front surface for exposing images thereon, and the film has a rear surface, for use with a camera having a lens and a film door, comprising:
    an endless tape forming a loop, the tape having printing symbols;
    two rollers which support the tape, the rollers rotating the tape when turned;
    a wheel which engages one of the rollers, the wheel being accessible from the outside of the camera so that turning the wheel engages one of the rollers and rotates the tape; and
    a means for directing light through the tape and onto the rear surface of the film wherein said light directing means is positioned within said loop so that the film is exposed on its rear surface with a symbol from the printing symbols of the tape and so that the front surface of the film is open to light passing through the lens and wherein the mechanism is detachably mounted within the film door.

2. The mechanism of claim 1 wherein the tape has an opaque portion with transparent symbols so that light from the means for directing light passes through the transparent symbols on the tape to expose the film with a symbol from the tape, the tape also having a second portion, said second portion having opaque symbols that are viewable from the outside of the camera from a window on the camera, the tape printed with symbols and oriented so that the opaque symbols that are viewable from the outside of the camera from the window on the camera are similar to the transparent symbols that light passes through to expose the film.

3. The mechanism of claim 1 wherein the tape is printed with symbols representing data selected from the group consisting of the date, the time and the picture number.

4. The mechanism of claim 1 wherein the tape has perforations along one edge, said perforations spaced to be correlated to the printed symbols on the tape, and wherein the roller which is engaged by the wheel has teeth, the teeth positioned to engage the perforations on the tape.

5. The mechanism of claim 1 wherein the two rollers are rubberized.

6. The mechanism of claim 1 wherein the wheel is attached to one of the rollers.

7. The mechanism of claim 1 wherein the wheel has gear-like knurling, said gear-like knurling is engaged with a fitted plunger, the fitted plunger is loaded with a spring, both the fitted plunger and the spring are attached to the camera so that the fitted plunger and spring together with the gear-like knurling on the wheel produce a detent action when the wheel is turned.

8. The mechanism of claim 1 wherein the means for directing light through the tape and onto the film comprises a light source, a means for triggering the light source to produce light, and a means for directing the light from the light source, through the tape, and onto the film, so that the film is exposed to a symbol from the printing symbols on the tape.

9. The mechanisms of claim 1 wherein there is a plurality of tapes, a plurality of rollers and a plurality of wheels.

10. The mechanism of claim 1 wherein the mechanism is used in a disposable camera.

11. The mechanism of claim 1 wherein the mechanism has a plurality of tape therein having messages printed thereon, so that when the mechanism is detached and replaced with another mechanism, new messages are provided to the camera.

12. A mechanism for imprinting symbols on film, wherein the film has a rear surface, for use with a camera with a film door, comprising:

a tape with connected ends thereby forming a continuous loop, disposed proximate the rear surface of the film and outside of the picture taking area, the tape having printing symbols, the tape also having perforations along one edge, said perforations spaced to be correlated to the printed symbols on the tape;

rubberized roller which supports the tape;

a wheel attached to a drive rubberized roller, the drive rubberized roller supporting the tape with the rubberized roller, the drive rubberized roller having teeth that engage the perforations along the edge of the tape, the drive rubberized roller acting with the rubberized roller to hold one part of the tape over the film and another part of the tape over a window on the camera so that a portion of the tape is viewable from outside of the camera through the window on the camera, the wheel being accessible from the outside of the camera so that turning the wheel engages and turns the attached drive rubberized roller which causes the tape to rotate, the wheel having gear-like knurling, said gear-like knurling is engaged with a fitted plunger, the fitted plunger is loaded with a spring so that the gear-like knurling, the fitted plunger and the spring together produce a detent action when the wheel is turned; and a bulb positioned within said loop, a means for triggering the bulb to produce light, and a means for directing the light from the bulb, through the tape, and onto the film, so that the film is exposed to a symbol from the printed symbols on the tape wherein the mechanism is detachably mounted within the film door.

13. The mechanism of claim 12 wherein the tape is printed with symbols representing data selected from the group consisting of the date, the time and the picture number.

14. The mechanism of claim 12 wherein the tape has an opaque portion with transparent symbols so that light from the means for directing light passes through the transparent symbols on the tape to expose the film with a symbol from the tape, the tape also having a second portion, said second portion having opaque symbols that are viewable from the outside of the camera from a window on the camera, the tape printed with symbols and oriented so that the opaque symbols that are viewable from the outside of the camera from the window on the camera are similar to the transparent symbols that light passes through to expose the film.

15. The mechanism of claim 12 wherein there is a plurality of tapes, a plurality of rubberized rollers, a plurality of drive rubberized rollers, a plurality of wheels, a plurality of fitted plungers, and a plurality of springs.

16. The mechanism of claim 15 wherein there is a plurality of bulbs, a means for triggering the plurality of bulbs to produce light, and a means for directing the light from the plurality of bulbs through the tapes and onto the film.

17. The mechanism of claim 12 wherein the mechanism is used in a disposable camera.

18. A mechanism for imprinting symbols on film wherein the film has a rear surface, for use with a camera having a swingable detachably connected back cover comprising:

an endless tape forming a continuous loop with printed symbols;

a means for supporting and rotating the tape;

a means for directing light through the tape and onto the rear surface of the film so that the film is exposed on the rear surface with a symbol from the printed symbols wherein said directing means is positioned within said continuous loop; and a housing that contains the tape, the means for supporting and rotating the tape, and the means for directing light through the tape, the housing being detachably connected to the camera's back cover, and wherein the back cover is adapted for providing a light proof covering of the film.

19. The mechanism of claim 18 wherein said continuous loop is disposed proximate the rear surface of the film and outside of the picture taking area, and the means for directing light through the tape and onto the film comprises a light source, a means for triggering the light source to produce light, and a means for directing the light from the light source, through the tape, and onto the film, so that the film is exposed to a symbol from the printed symbols on the tape.

20. The mechanism of claim 18 wherein the tape has an opaque portion with transparent symbols so that light from the means for directing light passes through the transparent symbols on the tape to expose the film with a symbol from the tape, the tape also having a second portion, said second portion having opaque symbols that are viewable from the outside of the camera from a window on the camera, the tape printed with symbols and oriented so that the opaque symbols that are viewable from the outside of the camera from the window on the camera are similar to the transparent symbols that light passes through to expose the film.

21. The mechanism of claim 18 wherein the tape is printed with symbols representing data selected from the group consisting of the date, the time and the picture number.

22. The mechanism of claim 18 wherein the film has a front surface for exposing images thereon and a rear surface, and wherein the tape has perforations along one edge, said perforations spaced to be correlated to the printed symbols on the tape, and wherein the means for supporting and rotating the tape comprises:
- a rubberized roller which supports the tape; and
- a wheel attached to a drive rubberized roller, the drive rubberized roller supporting the tape with the rubberized roller, the drive rubberized roller having teeth that engage the perforations along the edge of the tape, the drive rubberized roller acting with the rubberized roller to hold one part of the tape over the film and another part of the tape over a window on the camera so that a portion of the tape is viewable from the outside of the camera through the window on the camera, the tape printed with symbols and oriented so that the opaque symbols that are viewable from the outside of the camera from the window on the camera are similar to the transparent symbols that light passes through to expose an image on the rear of the film, the wheel being accessible from the outside of the camera so that turning the wheel engages and turns the attached drive rubberized roller which causes the tape to rotate, the wheel having gear-like knurling, said gear-like knurling is engaged with a fitted plunger, the fitted plunger is loaded with a spring so that the gear-like knurling, the fitted plunger and the spring together produce a detent action when the wheel is turned.

23. The mechanism of claim 18 wherein there is a plurality of tapes, a plurality of means for supporting and rotating the tapes, and means for directing light through the plurality of tapes and onto the film.

24. The mechanism of claim 18 wherein the mechanism has a plurality of tape therein having messages printed thereon, so that when the mechanism is detached and replaced with another mechanism, new messages are provided to the camera.

* * * * *